United States Patent
Spears et al.

(10) Patent No.: US 10,646,924 B2
(45) Date of Patent: May 12, 2020

(54) ADDITIVE MANUFACTURING USING A RECOATER WITH IN SITU EXCHANGEABLE RECOATER BLADES

(71) Applicant: GENERAL ELECTRIC COMPANY, Schenectady, NY (US)

(72) Inventors: Thomas Graham Spears, Springdale, OH (US); Rachel Levine, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 15/438,311

(22) Filed: Feb. 21, 2017

(65) Prior Publication Data

US 2018/0236549 A1 Aug. 23, 2018

(51) Int. Cl.
*B22F 3/105* (2006.01)
*B29C 64/20* (2017.01)
(Continued)

(52) U.S. Cl.
CPC .......... *B22F 3/1055* (2013.01); *B29C 64/153* (2017.08); *B29C 64/20* (2017.08); *B29C 64/386* (2017.08); *B22F 2003/1056* (2013.01); *B22F 2003/1057* (2013.01); *B22F 2999/00* (2013.01); *B29K 2105/251* (2013.01);
(Continued)

(58) Field of Classification Search
CPC ............ B22F 3/1055; B22F 2003/1056; B22F 2003/1057; B33Y 10/00; B33Y 30/00; B33Y 50/02; B29C 64/153; B29C 64/386; B29C 64/20; Y02P 10/295; B29K 2105/251
See application file for complete search history.

(56) References Cited

U.S. PATENT DOCUMENTS 3,567,120 A 3/1971 Suda et al.
4,863,538 A 9/1989 Deckard
(Continued)

FOREIGN PATENT DOCUMENTS

DE 19649865 C1 2/1998
EP 2191922 A1 6/2010
(Continued)

OTHER PUBLICATIONS

Kaufui V. Wong and Aldo Hernandez, "A Review of Additive Manufacturing," ISRN Mechanical Engineering, vol. 2012, Article ID 208760, 10 pages, 2012 (Year: 2012).*
(Continued)

*Primary Examiner* — Kevin E Yoon
*Assistant Examiner* — Ryan L Heckman
(74) *Attorney, Agent, or Firm* — Dority & Manning, P.A.

(57) ABSTRACT

The present invention is related to additive manufacturing methods and systems using a recoater with in-situ exchangeable recoater blades. Being able to switch out recoater blades in situ, i.e. without stopping the build and opening up the build chamber, is advantageous, especially for larger, more complicated, and/or longer builds. For instance, if a recoater blade becomes damaged, a new one can be readily swapped in. Or if a different material for the object(s) is used during the build, it may be advantageous to switch in a new recoater blade that is made of the new, different material.

19 Claims, 8 Drawing Sheets

(51) Int. Cl.
 *B29C 64/153* (2017.01)
 *B29C 64/386* (2017.01)
 *B33Y 10/00* (2015.01)
 *B33Y 30/00* (2015.01)
 *B33Y 50/02* (2015.01)
 *B29K 105/00* (2006.01)

(52) U.S. Cl.
 CPC ............... *B33Y 10/00* (2014.12); *B33Y 30/00* (2014.12); *B33Y 50/02* (2014.12); *Y02P 10/295* (2015.11)

(56) References Cited

U.S. PATENT DOCUMENTS

| | | | |
|---|---|---|---|
| 5,460,758 | A | 10/1995 | Langer et al. |
| 5,902,537 | A | 5/1999 | Almquist et al. |
| 7,690,909 | B2 | 4/2010 | Wahlstrom |
| 7,713,454 | B2 | 5/2010 | Larsson |
| 7,850,885 | B2 | 12/2010 | Philippi et al. |
| 8,021,138 | B2 | 9/2011 | Green |
| 9,254,535 | B2 | 2/2016 | Buller et al. |
| 9,346,127 | B2 | 5/2016 | Buller et al. |
| 2004/0094728 | A1 | 5/2004 | Herzog et al. |
| 2004/0170765 | A1 | 9/2004 | Ederer et al. |
| 2005/0001356 | A1* | 1/2005 | Tochimoto ............. B29C 41/12 264/308 |
| 2007/0075461 | A1 | 4/2007 | Hunter et al. |
| 2009/0206522 | A1 | 8/2009 | Hein et al. |
| 2011/0223349 | A1 | 9/2011 | Scott |
| 2011/0278773 | A1 | 11/2011 | Bokodi et al. |
| 2013/0101746 | A1 | 4/2013 | Keremes et al. |
| 2014/0077422 | A1 | 3/2014 | Minick |
| 2014/0348969 | A1 | 11/2014 | Scott |
| 2014/0377117 | A1 | 12/2014 | Herrmann et al. |
| 2015/0209889 | A1* | 7/2015 | Peters ................. B23K 9/1093 219/76.14 |
| 2015/0367415 | A1* | 12/2015 | Buller ................. B23K 26/346 419/53 |
| 2016/0121399 | A1 | 5/2016 | Buller et al. |

FOREIGN PATENT DOCUMENTS

| | | | |
|---|---|---|---|
| EP | 2202016 A1 | 6/2010 | |
| EP | 2 202 016 B1 | 4/2012 | |
| FR | 3058354 A1 * | 5/2018 | ............ B22F 3/1055 |
| WO | WO 2014/199149 A1 | 12/2014 | |
| WO | WO 2015/141779 A1 | 9/2015 | |
| WO | WO-2017143145 A1 * | 8/2017 | ............ B33Y 30/00 |

OTHER PUBLICATIONS

Machine Translation of FR-3058354-A1 (Year: 2018).*

* cited by examiner

ADDITIVE MANUFACTURING USING A RECOATER WITH IN SITU EXCHANGEABLE RECOATER BLADES

INTRODUCTION

The present disclosure generally relates to methods and systems adapted to perform additive manufacturing ("AM") processes, for example by direct melt laser manufacturing ("DMLM"). The process utilizes an energy source that emits an energy beam to fuse successive layers of powder material to form a desired object. More particularly, the disclosure relates to methods and systems that utilize a recoater arm with multiple recoater blades that may be swapped in and out in situ.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy directing device comprising an energy source that emits an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. No. 4,863,538 and U.S. Pat. No. 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material 112 using an energy beam 136 generated by a source such as a laser 120. The powder to be melted by the energy beam is supplied by reservoir 126 and spread evenly over a powder bed 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The powder bed 114 is lowered and another layer of powder is spread over the powder bed and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

FIG. 2 shows powder bed for additive manufacturing according to the prior art. A powder dispenser 201 is provided that pushes an amount of powder (e.g., CoCr) upward into the build chamber where a roller or arm 202 spreads the powder over the build plate 203. A laser heats the powder in a desired pattern corresponding to a cross section of a part, sintering or melting the powder to form a solid cross section slice on the build plate 203. The build plate is lowered and the powder dispenser and roller or arm redistributes a thin layer of powder over the build plate. The laser then heats the powder building on the earlier deposited pattern of fused material, thereby making successive layers in the additive manufacturing process.

Powder beds are commonly used in laser bed additive manufacturing techniques. These techniques generally require a step of providing a thin layer of powder over a build plate within the additive manufacturing apparatus. In one example, a powder dispenser 201 is provided that pushes an amount of powder (e.g., CoCr) upward into the build chamber where a roller or arm 202 spreads the powder over the build plate 103. FIG. 1. A laser heats the powder in a desired pattern corresponding to a cross section of a part, sintering or melting the powder to form a solid cross section slice on the build plate 203. The build plate is lowered and the powder dispenser and roller or arm redistributes a thin layer of powder over the build plate. The laser then heats the powder building on the earlier deposited pattern of fused material, thereby making successive layers in the additive manufacturing process.

FIG. 3 shows a powder bed and recoating system for additive manufacturing according to the prior art. A powder hopper 301 is used in conjunction with a recoater arm/temporary hopper 302. The recoater arm/temporary hopper 302 spreads a thin layer of powder over the build plate 303 by moving across the build plate and dropping powder in a controlled manner to provide a thin layer of powder. This process is repeated with each laser writing step and lowering of the build plate in the additive manufacturing process.

A problem that arises in prior art systems and methods is that the recoater blade may become damaged during the build process. This is particularly problematic for large or complicated builds that may take a longer time and/or involve more detailed structures and features. In general, the longer a build takes, the more likely it is that the recoater blade becomes damaged. If the recoater blade is damaged, it could compromise the quality and integrity of the object being built. Using a damaged blade during at least part of a long, complicated build could require the final object be discarded and rebuilt from scratch. Even if the damage is discovered quickly, to replace the recoater blade in the prior art systems and methods generally requires the whole system be shut down and opened up. This results in work stoppage, delay, and expense. Therefore there is a need to exchange a damaged recoater blade for an undamaged one, without substantially delaying or stopping the additive manufacturing process.

Also, for some builds, it may be desirable to use a different recoater blade material while building one or more object(s). In general, it is preferable for the recoater blade to be the same material as the material being used to make the object. If more than one material is used during a build, either to make portion(s) of an object, or to make a separate object, this may require the system to be shut down and opened up, so that an appropriate recoater blade can be installed. This results in work stoppage, delay, expense, and additional oxygen exposure. Also, it may be preferable to use a different recoater blade for some builds and/or portions of some builds that require very fine features. Therefore there is a need to exchange one recoater blade for another during an additive manufacturing process, without substantially delaying or stopping the additive manufacturing process.

SUMMARY OF THE INVENTION

The present invention is related to additive manufacturing methods and systems. In one embodiment of a method according to the present invention, a recoater is passed over a work surface to provide a layer of powder made of a given material, the recoater comprising a lowered recoater blade in a lowered position and one or more additional recoater blade(s) in a raised position, at least a portion of the layer of powder is irradiated to form a fused region, this process is repeated until the desired object is formed, and during the formation of the object the method comprises at least one step of recoating with a first recoater blade and a second recoater blade, and at least one step of switching the first recoater blade from a position where it contacts the layer of powder during the recoating step to a position where it does not contact powder during the recoating step. The process of switching may be simultaneous. In an aspect, the method of switching may involve raising the lowered recoater blade and lowering at least one of the additional recoater blades. In another aspect, the method of switching may involve a continuous process using, for example, a rotary mechanism.

In an aspect, the structure of one or more of the recoater blades can be monitored by, for example, using a camera. The camera may transmit data on the structure to a computer, and the computer can be configured to control a blade control device, such as a servo, that raises and/or lowers the recoater blades based on data received from the camera. For example, if a recoater blade in use is damaged, then it can be moved into a raised position and a different, undamaged recoater blade, can be moved into a lowered position and used. The given material for the powder may be different from one powder layer to the next, and each recoater blade may be made of a different material, such that there is always at least one recoater blade that is made of the same material as a particular powder layer. The powder may be, for example, cobalt chrome.

The present invention is also related to an additive manufacturing apparatus comprising an energy directing device, a powder dispensing unit, a recoater comprising a first recoater blade and a second recoater blade, and a blade control device. The blade control device may be, for example, a servo or a rotary drum. If the blade control device includes a rotary drum, then the apparatus includes at least one surface that moves due to the movement of the rotary drum, and at least the first and second recoater blades are mounted on the surface so that rotation of the rotary drum advances the second recoater blade into a position that contacts powder within the additive manufacturing apparatus. The powder dispensing unit may be a hopper. The energy directing device may be adapted to direct a laser beam, or it may be adapted to direct an electron beam. For example, if it is adapted to direct a laser beam, it may comprise an optical element selected from the group consisting of mirrors, deflectors, lenses, and beam splitters. Or, if it is adapted to direct an electron beam, it may comprise, for example, a deflector coil or a focusing coil. The recoater may comprise any suitable number of recoater blades, for example two or more, or preferably three or more, recoater blades. In one aspect, the first recoater blade may be made of a different material than the second recoater blade. In another aspect, at least one recoater blade is made of a different material than all the others. In a third aspect, there is at least one recoater blade that comprises a first material, at least a second recoater blade comprises a second material, and at least a third recoater comprises a third material, and wherein the first, second, and third materials are not the same. The blade material may be, for example, a pliable material. During operation one of the first recoater blade or the second recoater blade is positioned to contact a layer of powder within the additive manufacturing apparatus, and the device is capable of switching the first recoater blade from a position where it contacts the layer of powder during the recoating step to a position where it does not contact powder during the recoating step.

DETAILED DESCRIPTION

The detailed description set forth below in connection with the appended drawings is intended as a description of various configurations and is not intended to represent the only configurations in which the concepts described herein may be practiced.

Figure 1:
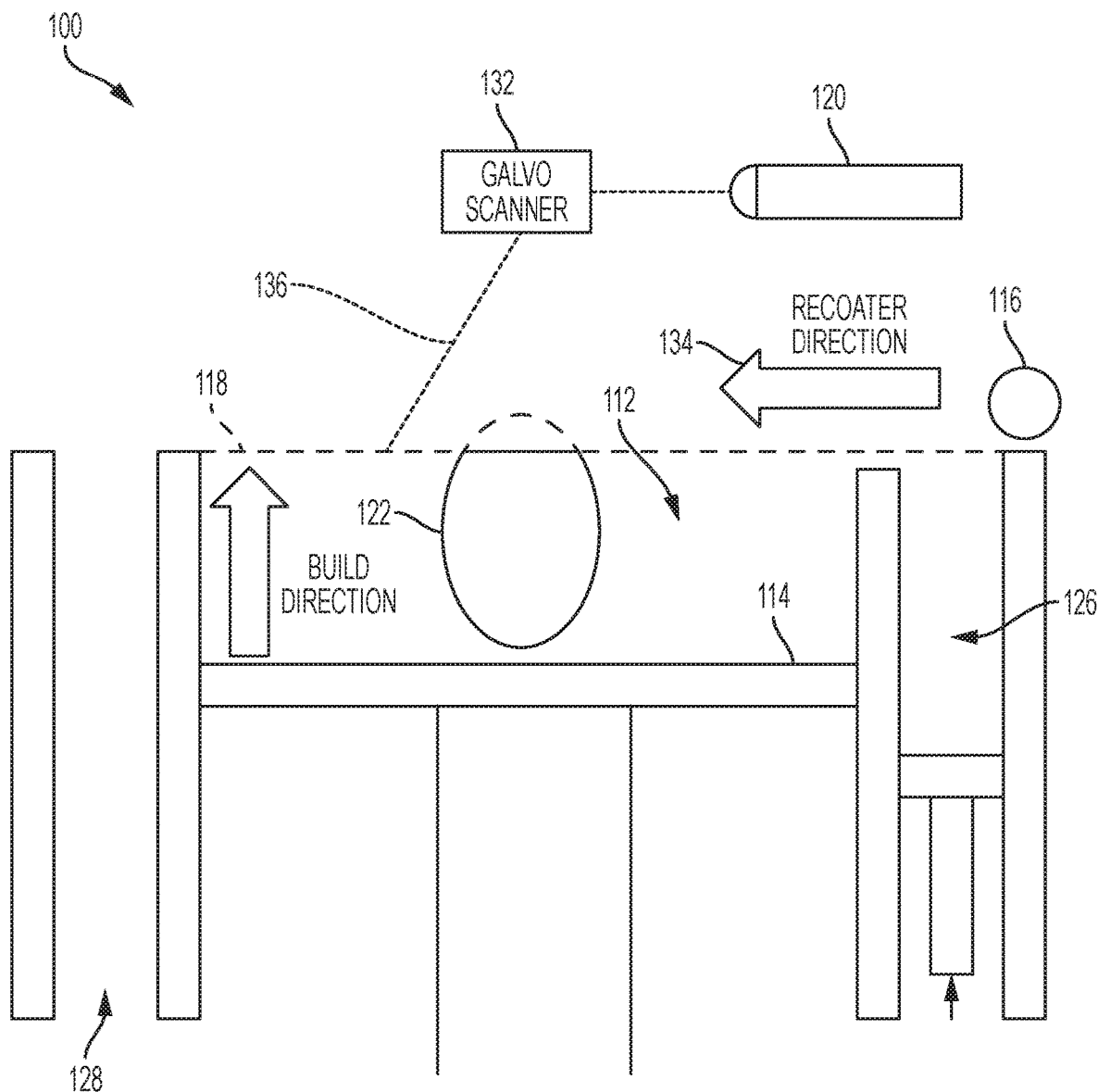
FIG. 1 is a powder bed containing an object made by an additive manufacturing process according to the prior art.
Figure 2:
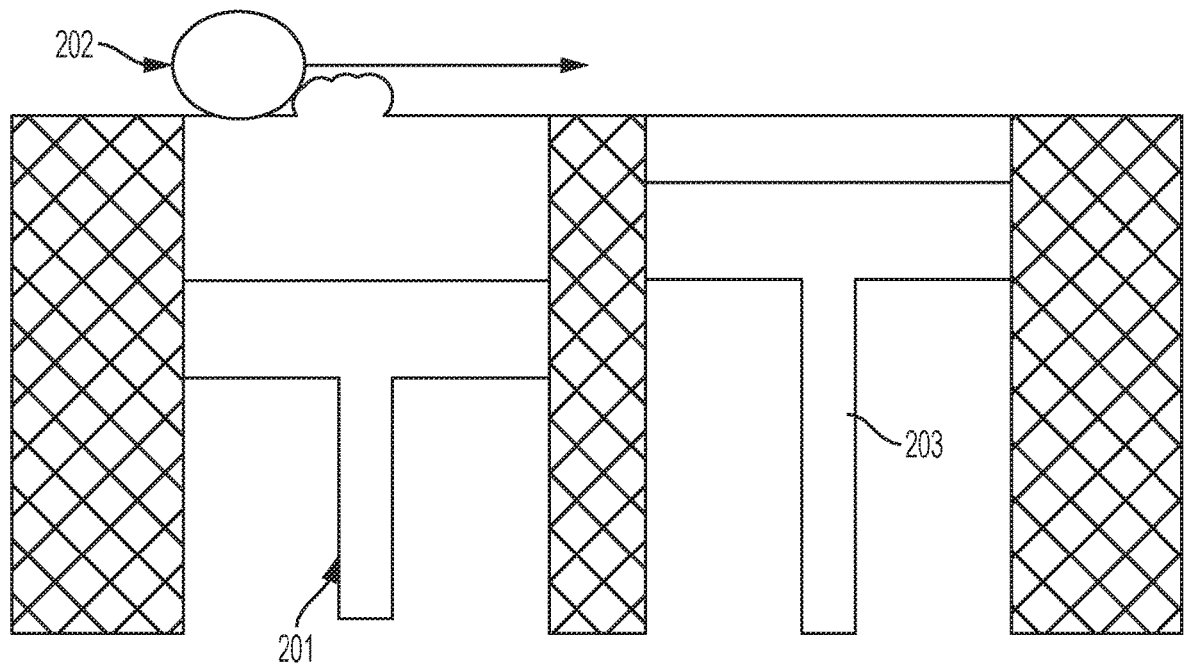
FIG. 2 is a schematic view of a conventional powder bed additive manufacturing process using a recoater arm to distribute powder in a horizontal fashion over a build plate.
Figure 3:
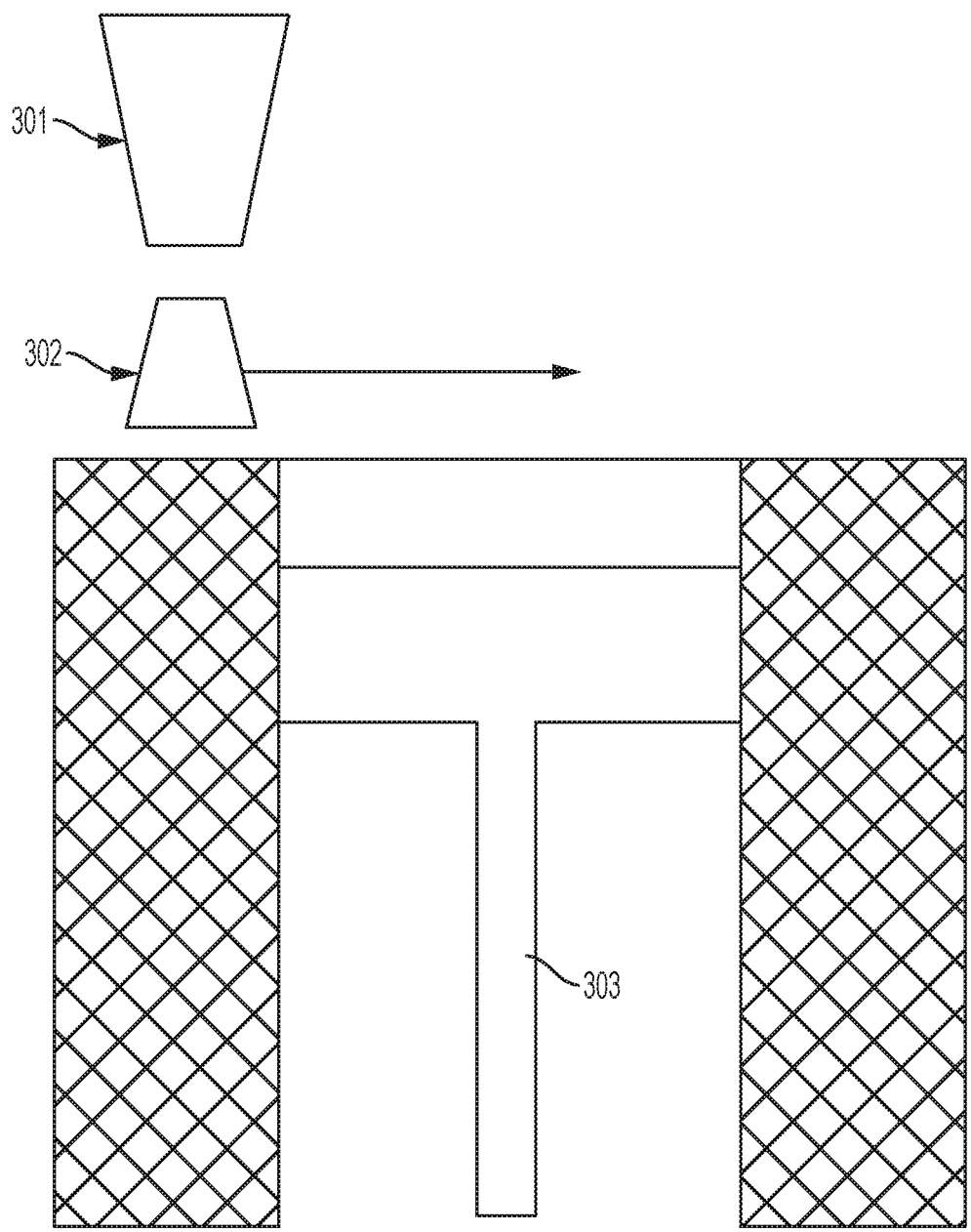
FIG. 3 is a schematic view of a conventional additive manufacturing apparatus using a hopper to distribute powder over a build plate.

The present invention is directed to recoaters for use in additive manufacturing systems and methods, including the systems and methods shown in, and described in reference to, FIGS. 1-3. For instance, FIG. 1 shows an exemplary prior art system for DMLM 100. The part 122 is built layer-by-layer by sintering or melting powder material in the shape of a layer of the object. The sintering or melting is performed using an energy beam 136 generated by an energy source such as a laser 120 and controlled by a galvo scanner 132. The powder to be melted by the energy beam is supplied by a reservoir 126 and then spread evenly over a build plate 114 using a recoater 116 traveling in a direction 134 to maintain the powder at a level 118 and remove excess powder material extending above the powder level 118. Some of the excess powder material is deposited in waste container 128. Then the build plate 114 is lowered and another layer of powder is spread over the build plate and the object being built, powder material is melted or sintered by the laser 120, and the process is repeated until the part 122 is complete.

FIG. 2 shows powder bed for additive manufacturing according to the prior art. A powder dispenser 201 is provided that pushes an amount of powder (e.g., CoCr) upward into the build chamber where a roller or arm 202 spreads the powder over the build plate 203. A laser heats the powder in a desired pattern corresponding to a cross section of a part, sintering or melting the powder to form a solid cross section slice on the build plate 203. The build plate is lowered and the powder dispenser and roller or arm redistributes a thin layer of powder over the build plate. The laser then heats the powder building on the earlier deposited pattern of fused material, thereby making successive layers in the additive manufacturing process.

FIG. 3 shows a powder bed and recoating system for additive manufacturing according to the prior art. A powder hopper 301 used in conjunction with a recoater arm/temporary hopper 302. The recoater arm/temporary hopper 302 spreads a thin layer of powder over the build plate 303 by moving across the build plate and dropping powder in a controlled manner to provide a thin layer of powder. This process is repeated with each laser writing step and lowering of the build plate in the additive manufacturing process.

Figure 4A:
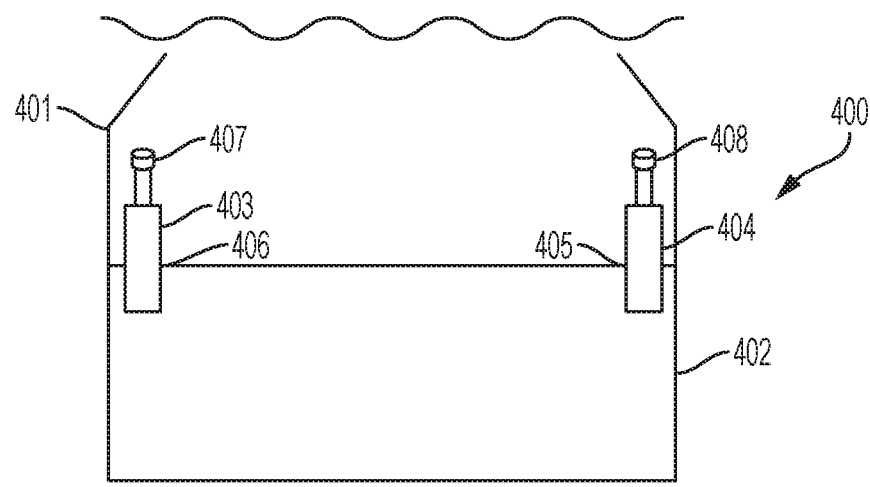
FIG. 4A is an illustration of a recoater arm with a single fixed recoater blade according to the prior art.
Figure 4B:
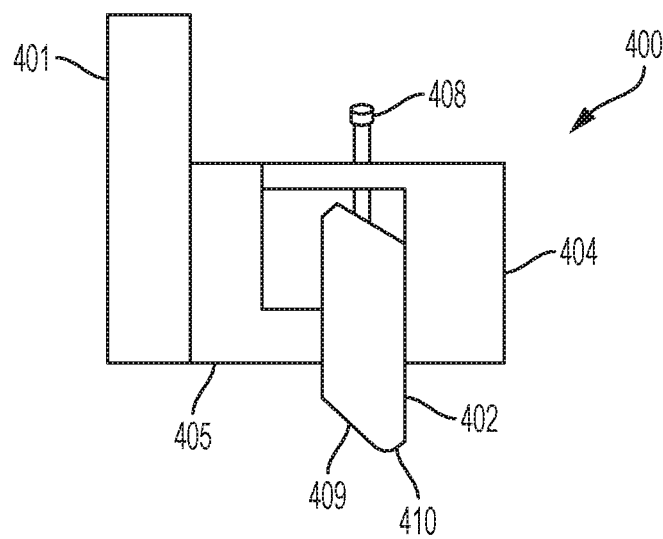
FIG. 4B is an illustration of a recoater arm with a single fixed recoater blade according to the prior art.

In the prior art methods and systems, a conventional recoater such as the one shown in FIG. 4 is used. FIG. 4A shows a frontal view and FIG. 4B shows a side or profile view. As shown in FIGS. 4A and 4B, a conventional recoater 400 comprises a recoater arm 401, a recoater blade 402, frontal clamp pieces 403 and 404, rear clamp pieces 405 and 406, and screws 407 and 408 that hold the blade 402 in place. The bottom of the blade 402 has a slant 409 and a beveled feature 410. In this recoater, there is only a single recoater blade and arm, and the recoater blade is not moveable with respect to the recoater arm during the build process.

Figure 5:
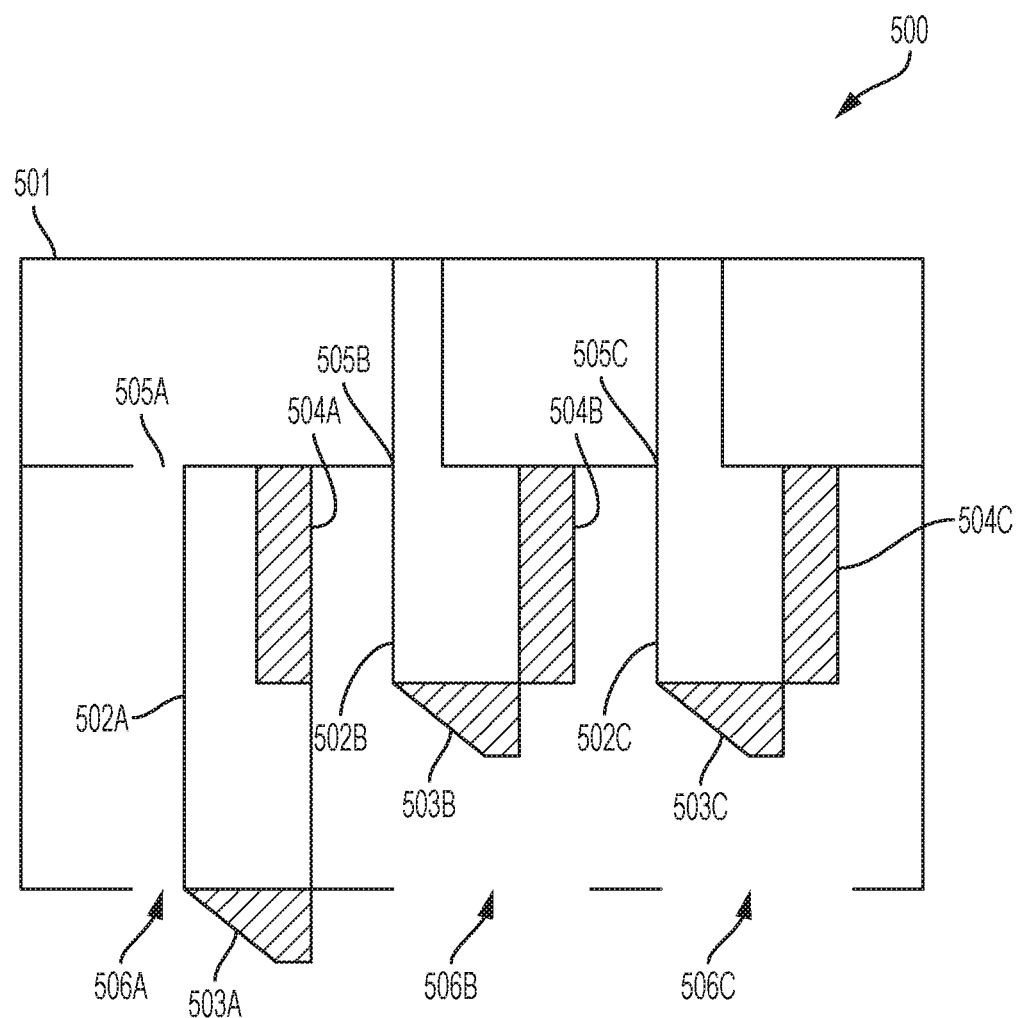
FIG. 5 is an illustration of a recoater with three recoater arms and three recoater blades according to an embodiment of the invention.

In contrast, an embodiment of the invention relates to additive manufacturing methods and systems using a recoater with in-situ exchangeable recoater blades, such as shown in FIG. 5. FIG. 5 shows a recoater 500, a housing 501, recoater arms 502A, 502B, and 502C, recoater blades 503A, 503B, and 503C, and locking blocks 504A, 504B, and 504C. There are also arm apertures 505A, 505B, and 505C, and blade apertures 506A, 506B, and 506C. In this particular configuration, the recoater arm 502A and recoater blade 503A have been lowered so that the blade 503A is in a position to smooth over a layer of deposited powder (not shown). Any one or more of the recoater arm(s) can be lowered and/or raised in any suitable arrangement. Lowering is accomplished by any suitable means, such as a servo, screw motor, solenoid, pneumatic system, or hydraulic system (not shown in this figure). The locking blocks 504A, 504B, and 504C serve to hold the respective recoater blades and recoater arms in place if and when they experience an upward pressure or force. Accordingly, the prior art systems and methods described and shown in FIGS. 1-3 can be improved by substituting the conventional recoater (element 116, 202, or 302) with a recoater according to an embodiment of the invention (for example, FIG. 5). As such, one can swap out recoater blades without substantial work stoppage or slowing, which is advantageous for longer, larger, and/or more complicated builds. This is also advantageous for reducing oxygen exposure. Further, for builds involving more than one material, methods and systems according to embodiments of the present invention are advantageous because it is preferable that the recoater blade used to smooth over the powder be the same material as the powder itself. So if a different powder material is deposited, is advantageous to quickly and easily switch out recoater blades, such that the new recoater blade material is the same as the new powder material.

In addition to modifying the systems and methods of the prior art to create new and useful methods and systems according to embodiments of the invention, the present invention is related to additive manufacturing methods comprising depositing powder, spreading the powder with a recoater comprising a given recoater blade in the lowered position and one or more additional recoater blades, focusing an energy beam on at least a portion of the powder to make a fused region, then repeating until the desired object is formed, wherein there is at least one step of raising the given recoater blade into the raised position. In an aspect, there is also at least one step of lowering at least one of the one or more additional recoater blades. There may be any suitable number of recoater arms and blades, and the steps of raising and lowering may be performed as many times as deemed appropriate.

The powder is preferably a metallic alloy, polymer, or ceramic powder. Unused powder can be collected in a powder receptacle, and recycled if desired. The portion of powder may be provided by, for example, depositing the powder via a hopper. The step of focusing an energy beam can be accomplished with, for example, a laser or an e-beam apparatus. E-beam systems are well known in the art. For example, U.S. Pat. No. 7,713,454 to Larsson titled "Arrangement and Method for Producing a Three-Dimensional Product" ("Larsson") discusses e-beam systems, and that patent is incorporated herein by reference. In an aspect, at least one of the recoater blades is monitored for damage, and if it is damaged, it is moved into the raised position, and another recoater blade is moved into the lowered position. Monitoring for damage may be performed by any suitable means, for instance using a camera configured to transmit data to a computer, eddy current detectors, vibration monitoring of the recoater, or laser profilometry of the blades in their rest position.

In an embodiment, the invention relates to an additive manufacturing apparatus comprising an energy directing device, at least two recoater arms each with a recoater blade, and a blade control device configured to move the recoater blades into a raised position and a lowered position. The energy directing device may be, for example, a laser or an electron beam. The blade control device may be, for example, a servo, screw motor, solenoid, pneumatic system, or hydraulic system. In an aspect, the apparatus may comprise a system for inspecting at least one of the recoater blades. The system may be any system capable of inspecting the recoater blades, for instance a camera. The camera may transfer the data collected to a computer. The computer may be part of the camera, or it may be separate. The computer may be configured to control the blade control device based on the data received from the camera.

Figure 6:
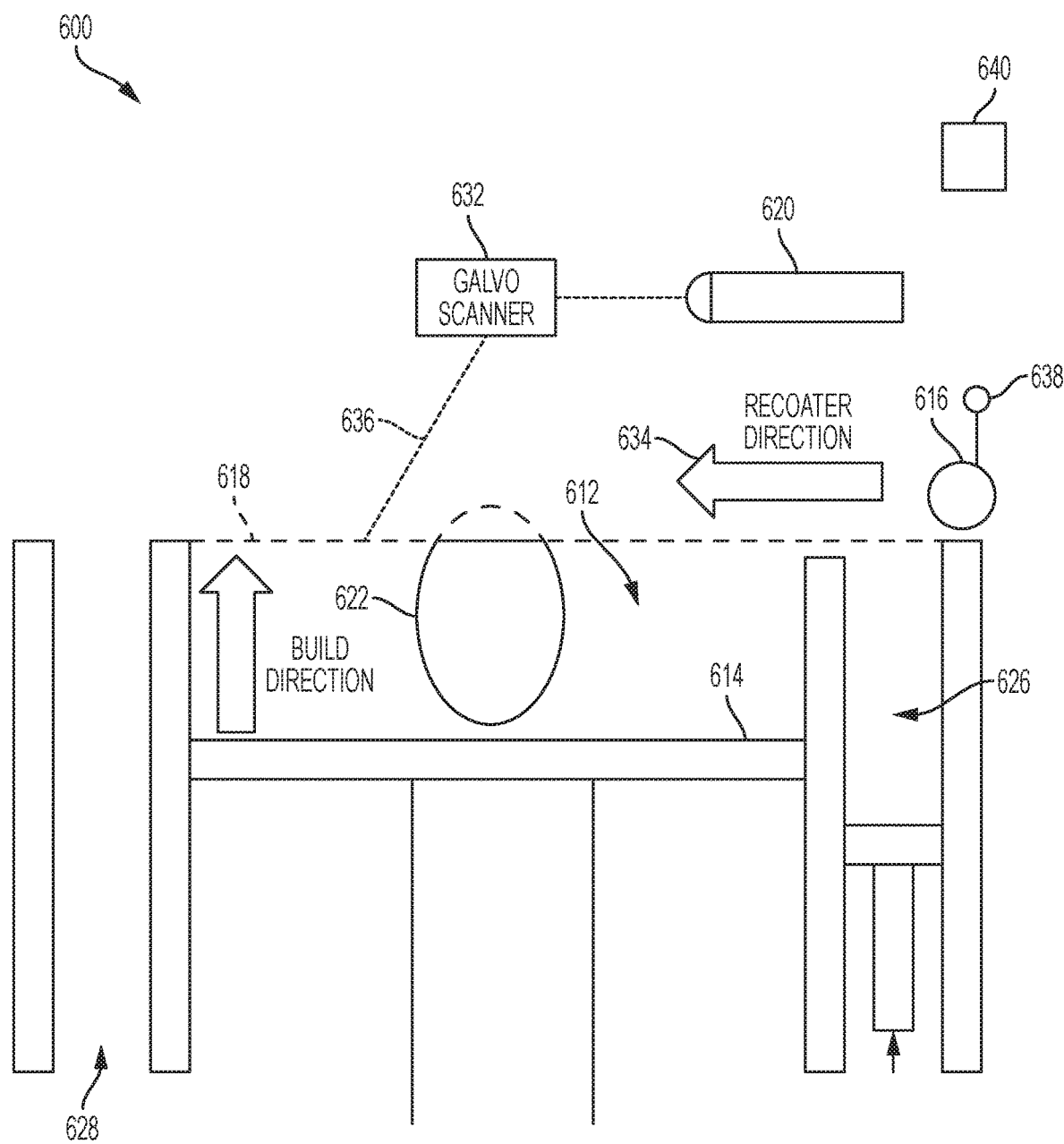
FIG. 6 is a powder bed containing an object made by an additive manufacturing process according to an embodiment of the invention.

FIG. 6 shows an additive manufacturing system according to an embodiment of the invention. The part 622 is built layer-by-layer by sintering or melting powder material in the shape of a layer of the object. The sintering or melting is performed using an energy beam 636 generated by an energy source such as a laser 620 and controlled by a galvo scanner 632. The powder to be melted by the energy beam is supplied by a reservoir 626 and then spread evenly over a build plate 614 using a recoater 616 comprising multiple recoater arms and blades, for example as illustrated in FIG. 5, traveling in a direction 634 to maintain the powder at a level 618 and remove excess powder material extending above the powder level 618. Some of the excess powder material is deposited in waste container 628. Then the build plate 614 is lowered and another layer of powder is spread over the build plate and the object being built, powder material is melted or sintered by the laser 620, and the process is repeated until the part 622 is complete. There is also a camera 638 attached to the recoater arm that is capable of transferring data to a computer 640, which allows the physical structural state of the recoater blades to be monitored. The apparatus can be configured such that the computer 640 controls the blade control device (which may be, for example, a servo) based on data from the camera.

Figure 7A:
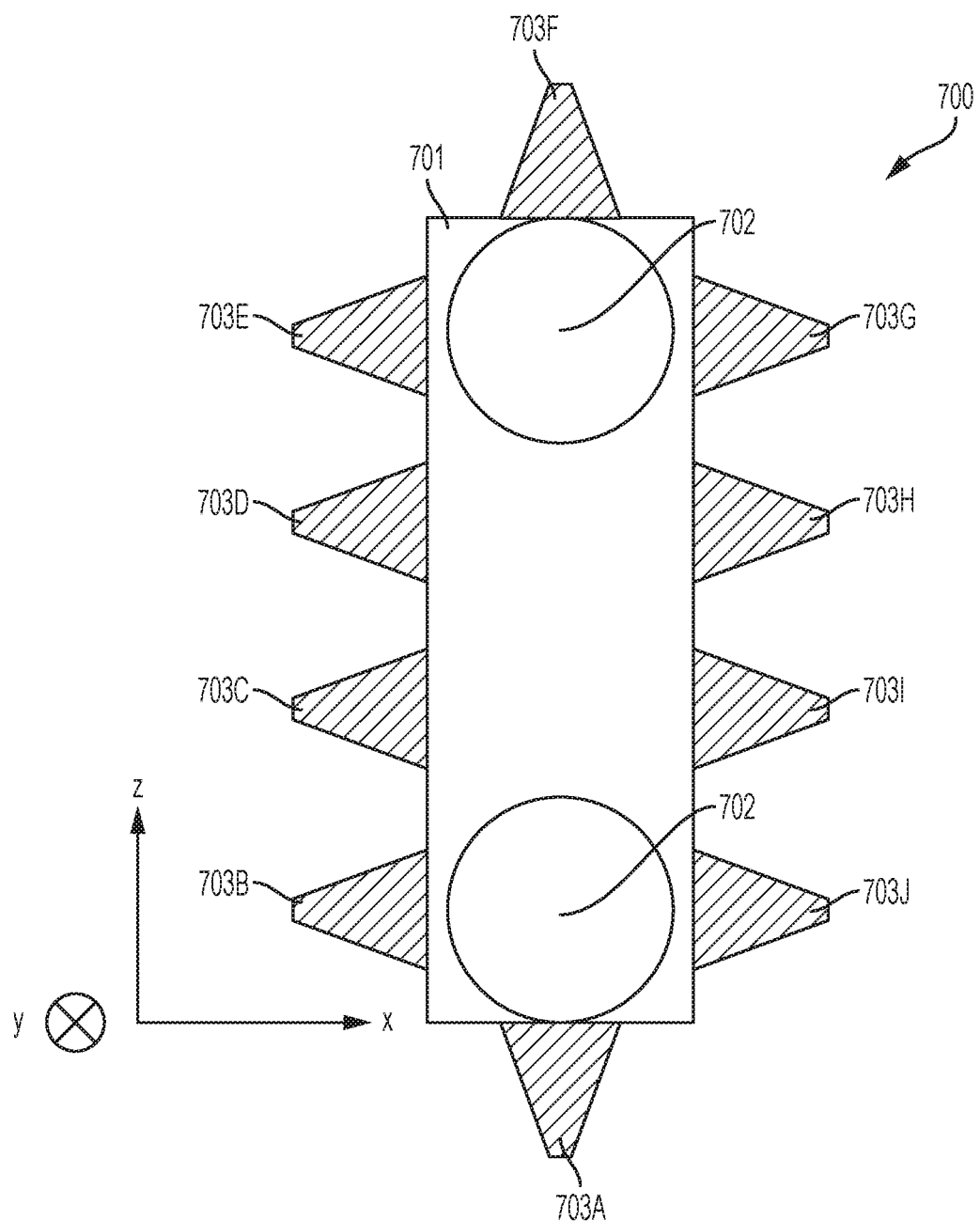
FIG. 7A is a side-view of a recoater blade system with incrementing recoater arms.
Figure 7B:
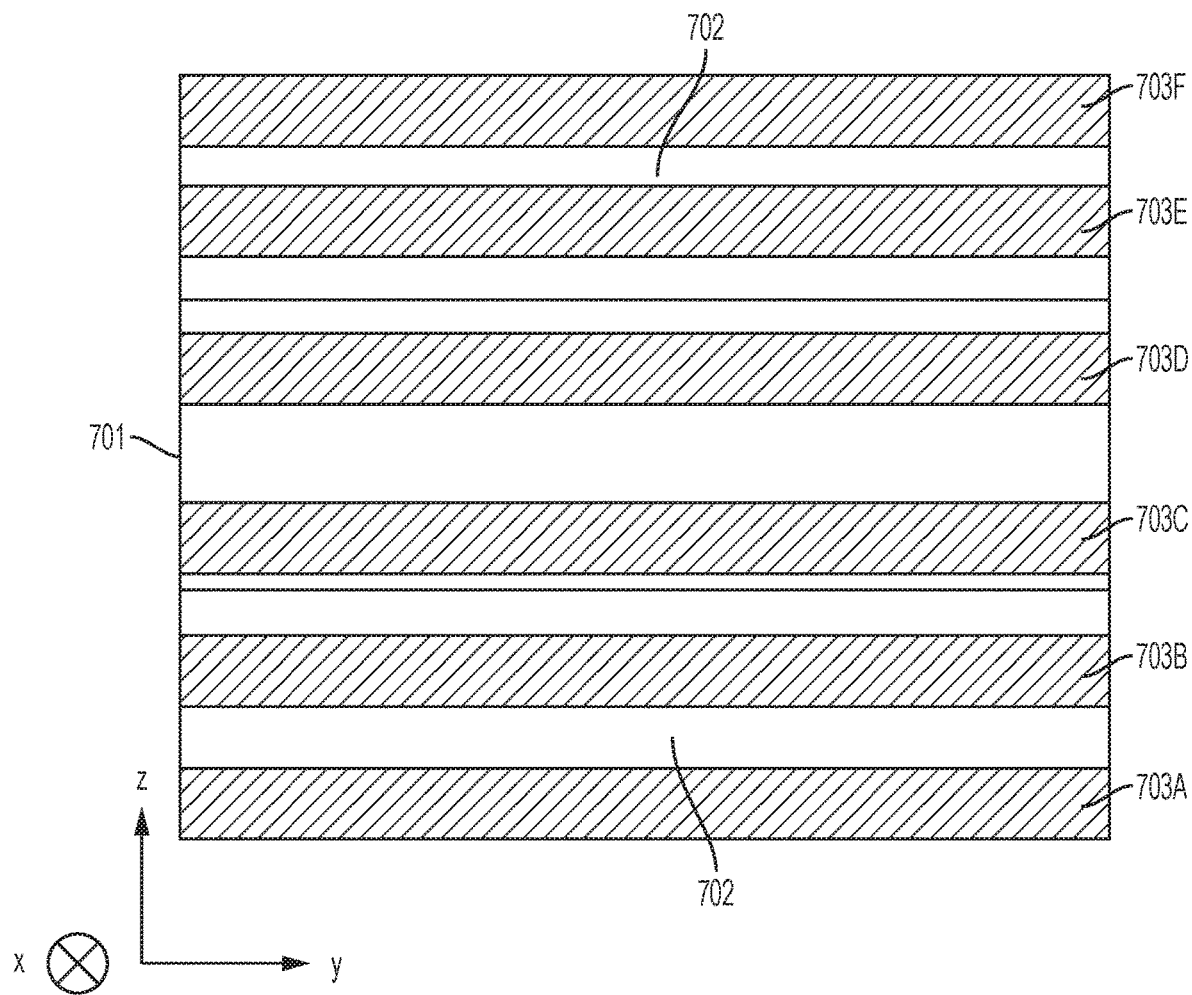
FIG. 7B is a front-view of a recoater blade system with incrementing recoater arms.

FIG. 7A shows an embodiment of the invention where discrete exchangeable recoater blades are provided in a way that allows exchange of recoater blades using a rotary mechanism. Here the recoater 700 includes rotary drums 702 on both ends that allow movement of a surface sheet 701 upon command. Several recoater blades 703A-J are provided on the surface sheet 701. The recoater blade in position 703A contacts the powder bed during use. Upon rotation of the rotary drums 702, the next recoater blade may 703B may be moved into the position occupied by 703A. In this case, the recoater blade 703A will be moved into the position occupied by 703J. FIG. 7B shows a front view of the recoater 700. From this front view one can see recoater blades 703A-F. The remaining blades 703G-J are obscured by the recoater 700. One advantage of recoater 700 is that it can utilize pliable recoater blades, and replace those blades during operation of the powder bed fusion device without substantial downtime, and also without additional oxygen exposure associated with shutting down and opening the machine. It is also advantageous for builds involving more than one material, because it is preferable that the recoater blade used to smooth over the powder be the same material as the powder itself. So if a different powder material is deposited, is advantageous to quickly and easily switch out recoater blades, such that the new recoater blade material is the same as the new powder material.

The recoater blades used in accordance with this invention may be made with any suitable material. The ability to switch recoater blades during the build enables the use of more pliable materials for a recoater blade. The pliable material may be a material unlike the powder in the powder bed, or it may be the same. In one aspect, the pliable material is made of the same material as the powder in the powder bed, but has a controlled thickness that determines the pliability of the blade. In another aspect, the pliable material is a polymeric material. In another aspect, the pliable material is comprised of carbon fibers. The use of a pliable blade can be advantageous where the object being built is delicate and may be damaged by a rigid recoater blade. In one embodiment, the recoater utilizes several blades having two or more degrees of pliability. It may be advantageous to use a rigid recoater blade in layers where the object to be built is robust and can withstand impingement with a rigid recoater blade, and to use a more pliable in layers of the object that are more delicate and impingement with a rigid blade could damage the layer being built.

In an aspect, the present invention relates to additive manufacturing methods and systems using a recoater with two or more recoater arms and recoater blades, for example as shown in FIG. 5, and a blade control device such as a servo, which are incorporated or combined with features and aspects of other powder bed additive manufacturing methods and systems such as:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Mobile Scan Area," and filed Jan. 13, 2017.

U.S. patent application Ser. No. 15/406,444, titled "Additive Manufacturing Using a Dynamically Grown Build Envelope," and filed Jan. 13, 2017.

U.S. patent application Ser. No. 15/406,461, titled "Additive Manufacturing Using a Selective Recoater," and filed Jan. 13, 2017.

U.S. patent application Ser. No. 15/406,471, titled "Large Scale Additive Machine," and filed Jan. 13, 2017.

All of the above applications are fully incorporated herein by reference.

The methods and systems are not limited to the specific embodiments described herein, but rather components of the methods and systems may be utilized independently and separately from other components described herein. For example, the methods and systems described herein may have other industrial and/or consumer application and are not limited to practice with only powder bed fusion systems as described herein. Rather, the present invention can be implemented and utilized in connection with many other applications. While the invention has been described in terms of various specific embodiments, those skilled in the art will recognize that the invention can be practiced with modification within the spirit and scope of the claims.

The invention claimed is:

1. An additive manufacturing method comprising:
(a) passing a recoater over a work surface to provide a layer of powder made of a given material, the recoater comprising a lowered recoater blade in a lowered position and one or more additional recoater blade(s) in a raised position;
(b) irradiating at least a portion of the layer of powder to form a fused region; and (c) repeating steps (a) and (b) until an object is formed; and during the formation of the object the method comprises at least one recoating step with a first recoater blade and a second recoater blade, and at least one step of switching the first recoater blade from a position where it contacts the layer of powder during the recoating step to a position where it does not contact powder during the recoating step;

wherein the step of switching the first recoater blade from the position where it contacts the layer of powder during the recoating step to the position where it does not contact powder during the recoating step comprises:

rotating a first rotary drum configured to move a surface around the first rotary drum and a second rotary drum, the first recoater blade and the second recoater blade being mountable on the surface.

2. The method according to claim 1, comprising at least one step of raising the lowered recoater blade and lowering at least one of the additional recoater blade(s).

3. The method according to claim 2, comprising monitoring the physical structure of one or more of the recoater blades.

4. The method according to claim 3, wherein said monitoring is by a camera and a computer configured to move any one or more of the recoater blades between the raised position and the lowered position.

5. The method according to claim 1, wherein the switching simultaneously moves the first and the second recoater blade, such that the second recoater blade is placed in contact with the layer of powder.

6. The method according to claim 1, wherein the switching is a continuous process involving a rotary mechanism.

7. The method according to claim 1, wherein at least the first or the second recoater blade is made from a pliable material.

8. The method according to claim 1, wherein the lowered recoater blade(s) is/are made of the same material as the layer of powder.

9. The method according to claim 1, wherein the given material is cobalt chrome.

10. An additive manufacturing apparatus comprising:
an energy directing device;
a powder dispensing unit;
a recoater comprising a first recoater blade and a second recoater blade; and
a blade control device comprising a first rotary drum, a second rotary drum, and a surface disposed around the first rotary drum and the second rotary drum, the first recoater blade and the second recoater blade being mountable on the surface, wherein during operation one of the first recoater blade or the second recoater blade is positioned to contact a layer of powder within the additive manufacturing apparatus, and the device is capable of switching the first recoater blade from a position where it contacts the layer of powder during the recoating step to a position where it does not contact powder during the recoating step.

11. The apparatus according to claim 10, wherein the blade control device is a servo.

12. The apparatus according to claim 10, wherein the energy directing device is adapted to direct a laser beam.

13. The apparatus according to claim 12, wherein the energy directing device is an optical element selected from the group consisting of mirrors, deflectors, lenses, and beam splitters.

14. The apparatus according to claim 10, wherein the energy directing device is adapted to direct an e-beam.

15. The apparatus according to claim 14, wherein the energy directing device is a deflector coil or a focusing coil.

16. The apparatus according to claim 10, wherein the recoater comprises 3 or more recoater blades.

17. The apparatus according to claim 10, wherein the first recoater blade is made of a different material than the second recoater blade.

18. The apparatus according to claim 16, wherein at least one recoater blade is made of a different material than all the others.

19. The apparatus according to claim 16, wherein at least one recoater blade comprises a first material, at least a second recoater blade comprises a second material, and at least a third recoater comprises a third material, and wherein the first, second, and third materials are not the same.

* * * * *